J. D. WHITE.
Turning Lathe.

No. 7,390.

Patented May 21, 1850.

UNITED STATES PATENT OFFICE.

I. D. WHITE, OF HARTFORD, CONNECTICUT.

LATHE FOR TURNING.

Specification of Letters Patent No. 7,390, dated May 21, 1850.

*To all whom it may concern:*

Be it known that I, I. D. WHITE, of the city and county of Hartford and State of Connecticut, have invented a new and useful Improvement on a Turning-Lathe; and I hereby do declare that the following is a full, clear, and exact description.

The nature of my invention consists in providing what I call a "movable way" on which the tool stock slides, and by which it is guided the said way being constructed with one end secured by a permanent pivot or vertical axis joint to the lathe table; and the other end of the said way constructed with a slot in it through which passes a set screw to hold that end of the way to the table, and also to allow that end of the way to be moved out and in, to and from the revolving axle on the lathe, so that when the tool stock is moving along on the slide with the tool in contact with the axle to be turned—the said movable way will so guide the cutting tool as to turn any axle or shaft of a tapering form; and also, by the said movable way being set parallel with the revolving axis to be turned the cutting tool will be thereby enabled to turn journals or shafts of an equal diameter throughout. My invention further consists in providing two such movable ways to one lathe, and arranging the driving gearing at and on the middle of the lathe having two head stocks and a chuck on the middle of the lathe, so that two cutters may be turning the different ends of a railroad car axle at one time, the one cutter turning the taper while the other is turning the journal of the axle at the other, which requires the operator's undivided attention.

My invention further consists in providing an opening in the chuck, head stocks, and chuck spur wheel whereby the axle can be placed in and taken out of the chuck at the side instead of endways, the heretofore known practice.

To enable others skilled in the art to make and use my invention I will proceed to describe its construction and operation, reference being had to the accompanying drawings, making a part of this specification, in which—

Figure 1:
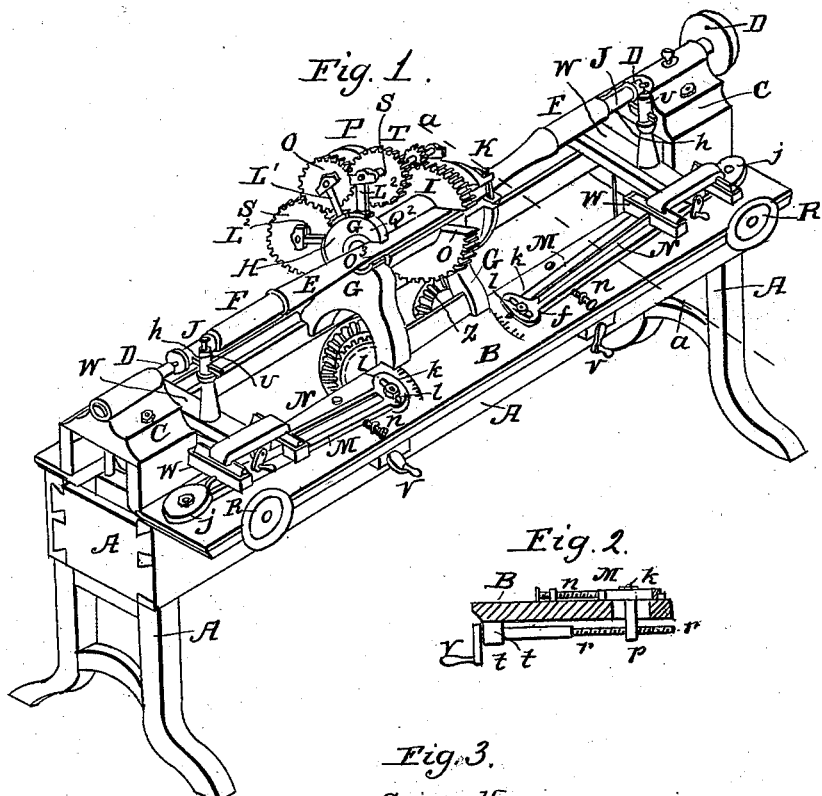
Figure 2:
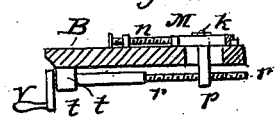
Figure 3:
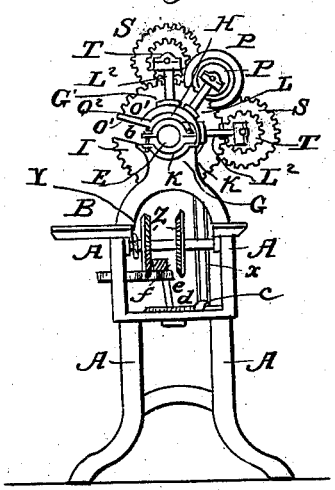

Figure 1, is a perspective view. Fig. 2, a transverse section of the movable way and Fig. 3, a transverse section taken at the line $(a, a)$.

The same letters indicate like parts on all the figures.

A, is the frame made in any of the known ways.

B, is the table like those in use. On it are placed and to it attached the "movable way."

C, C, are the tail blocks or stocks, made in the usual manner.

D, D, are the fixed centers of the tail blocks to retain the axle. In the common slide-lathe there is one head and one tailstock at the opposite ends of the lathe.

E is the rough axle to be turned. It is made with two taper parts and two journals, both of which have to be turned true in the lathe, the journals to revolve in the journal boxes and the tapers formed to receive the wheel.

F, F, are the tapers of the axle and J, J, the journals.

G, G, are the head stocks they are placed and secured at the middle of the lathe, and made in the usual way only with the exception of an opening in each on one side.

H, is the chuck made in any of the known ways with the exception of an opening in its side extending its whole length to receive the axle to be turned through its side.

I is a large spur wheel. It is secured to the chuck—around it like a ring. This spur wheel revolves the chuck.

$O^1$ is a slot in the wheel to allow the axle E to be placed sideways in the chuck.

When the axle is desired to be placed in the lathe the openings or slots $O^1$ $O^2$ $O^3$ of the spur wheel chuck and head stocks are brought to coincide with one another when the axle can easily be placed through these openings in the chuck and the two ends of the axle secured in the dead or fixed centers on the tail blocks. The axle is made to revolve with the chuck by a clasp coupler K Fig. 3. This clasp coupler is formed by two semicircular bands secured at both sides by screws passing through holes in each to receive them, and by turning the said screws the coupler will be firmly fastened around and to the axle. On the end of one clasp there is fastened by any common means a small catch bar or pin which projects horizontally into the slot $O^2$ of the chuck, therefore when the chuck is revolved by the spur wheel I, the catch bar $(b)$ of the coupler is caught by the chuck and the axle is revolved along with it. There are various devices to modify this mode of coupling, but in my lathe the chuck is made to project over the seat of the stock head, this being a good arrangement to facilitate the coupling of the axle with the chuck and besides, when the axle is perfectly turned it is taken out of the chuck by releasing the coupler from it, and taking out the axle in the same manner in which it was put in the chuck. This chuck is revolved as follows: A driving band passes over the pulley P, in the usual way. The shaft or axle of the pulleys is supported on two standards $L^1$ one of which is placed on one stock head, and the other on the opposite stock head.

On the pulley shaft is a small spur wheel Q, Fig. 1, which meshes into two larger spur wheels, S, S, of equal diameter and fixed on different axles $L^2$, $L^2$ supported on the stock heads in the same manner as the pulley axle. On these two axles $L^2$ $L^2$ are fixed two other spur wheels T, T, of equal diameter, but smaller than S, S. These two mesh into the teeth of the chuck spur wheel I, and drive it giving motion to the chucks, axle, and the slides. These two wheels T, T, have the same speed and mesh into the teeth of I at such a distance from one another as will allow one to drive I, as a compensation wheel, when the slot $O^1$ is passing the teeth of the other.

The arrangement of the gearing for operating the sides for feeding, is described as follows: The gearing is double and the description of one, describes the other. ($x$) is a band which passes over a small pulley on the axle of T, $L^2$ and extends down passing over a small pulley on a short horizontal shaft fixed on a transverse beam on the frame below. This horizontal shaft has a small worm wheel on it which meshes into ($d$) and drives the upright axle ($e$) which has a bevel pinion $f$ on the upper end of it which meshes into Z, Z, the one for the forward and the other for the backward motion of the slide which can be changed by a clutch in the usual manner. Y is a small pulley on the transverse shaft of Z, Z, around which passes a cord running horizontally along through the eye of a projecting bar attached to the transverse part of the slide W, and passes around a shaft R which extends across the frame of the lathe. This cord is the feed of the slides—it moves them and the tool stocks on the rails in the usual way and therefore need not be further described.

The part which is of most importance to describe is the movable way which is described as follows: I use two movable ways on this lathe for turning the axle, but the movable way can be attached to any slide lathe whatever and answer an important purpose. M is the movable way; it is a broad plate of metal with an elevated rail it extending on its central part nearly its whole length. One end of this movable way or plate is secured to the table B, near its end by a pivot joint or vertical axis $y$, with a nut on its head screwed down on to the plate. The other end of M, is held to the table by a set screw or screw bolt $k$. This inner end of the movable way has an elongated slot $l$, cut or cast on it through which passes $k$ the set screw with a nut head to hold the plate to the table B, but owing to the slot being crosswise, on that end of the plate or movable way, the said plate or way can be moved out and in, to and from a parallel line with the revolving axis of the axle. As, $j$, is the vertical axis of M, one end of the movable way will always be equi-distant from the rotating horizontal axis, while the other end by the slot being in it can be moved to a greater distance from the revolving axis and thus the slide and cutter on the tool stock may describe different angles to the revolving axis to cut axles of different tapers.

The slide W, W is placed upon the rail N, of the movable way and extends across the lathe in the usual way. On W, W, is fixed the tool stock U, which is of the common form. The cutter $h$ which is secured in the tool stock is to turn axle shafts and C of various diameters and different forms. The tool stock and cutter moves with the slide on the rails—being moved by the feeding gear already described.

The object of the movable way is for turning axles, or shafts that have a tapering form, and also for the turning of journals or shafts of equal diameter throughout. Axles for railroad cars are made of the form of E, therefore the cutter must cut the journals J, J, of equal diameters throughout and cut the tapers F, F, for the reception of the wheels. This movable way is invented to accomplish this without any necessity of shifting the head or tail blocks. The movable way is operated as follows, see Fig. 2: M is the movable way ($p$) is a perpendicular bar secured to the bottom of M, and passing through the table B, extending below it near the inner end of the said movable way. In the bar ($p$) there is an eye with an interior thread; through it passes a worm screw ($r$) transversely with the table and secured by a strap or suspension block $t$, $t$, to the table and passing through the said block; therefore by turning the handle V, the slot end of M, the movable way will be moved to and from the axle to any angle with it according to the length of the slot ($l$). The set screw ($n$) secured on the table and pressing against the movable way, is for the purpose of holding the said way more firmly to the table when there may be a great strain upon the cutter. By having a small pointer on the inner end of the movable way, and an index on the table, the exact angle which the movable way will describe with the revolving axis will be accurately ascertained at all times. The two handles R, R, of the transverse shafts of the feeding gear of the slides are for the purpose of making a quick return motion of the slides in the usual way. For turning railroad car axles this double lathe is peculiarly adapted inasmuch as it takes much less room than two common lathes, while it can all nearly be made with one set of patterns, and one man can attend it much easier than to attend to two common slide lathes. It can therefore be made cheaper by a great deal, than two lathes while it answers the same purpose and with the movable ways a far superior purpose.

In turning a railroad car axle, the operator sets one cutter to turn the journal at one end, and the other cutter to turn the taper of the axle on the other end; this can be done most easily by the movable ways; one movable way for the taper has but to be set at an angle with the revolving axle, while the other for turning the journal of the axle is set parallel with the rotating axis of the axle E. As the turning of the journal requires the careful attention of the operator, one cutter is cutting the taper which requires but little attention while the other cutter is turning the journal, therefore the taper and journals of the axle of the opposite ends are turned alternately, the taper of one, and the journal of the other at one time, and vice versa.

The movable way is an excellent arrangement for all lathes, it being simple and easy to manage.

Having described my invention, its nature, construction, and operation, I claim—

The central stock heads G, and the chuck H, and the large spur wheel I, with the slots in them to allow the axle to be placed in and taken out of the chuck sideways; the spur wheel I, being driven by spur wheels Q, S, S, and T, T, the one T acting as a compensation gearing to the other, while the slot of the large spur wheel is passing the other spur wheel T, in the manner substantially as set forth.

I. D. WHITE.

Witnesses:
O. D. MUNN,
ELI POLHAMUS.